US009875771B2

(12) United States Patent
Ju et al.

(10) Patent No.: US 9,875,771 B2
(45) Date of Patent: Jan. 23, 2018

(54) APPARATUS OF PROVIDING A USER INTERFACE FOR PLAYING AND EDITING MOVING PICTURES AND THE METHOD THEREOF

(71) Applicant: PROMPT, INC., Seoul (KR)

(72) Inventors: Hyun Sun Ju, Seongnam-si (KR); Ji Sung Park, Suwon-si (KR); Hae Myung Choi, Seoul (KR); Byung Ho Choi, Seoul (KR)

(73) Assignee: PROMPT, INC. (KR)

( * ) Notice: Subject to any disclaimer, the term of this patent is extended or adjusted under 35 U.S.C. 154(b) by 15 days.

(21) Appl. No.: 14/906,604

(22) PCT Filed: Nov. 26, 2013

(86) PCT No.: PCT/KR2013/010753
§ 371 (c)(1),
(2) Date: Jan. 21, 2016

(87) PCT Pub. No.: WO2015/012444
PCT Pub. Date: Jan. 29, 2015

(65) Prior Publication Data
US 2016/0172000 A1 Jun. 16, 2016

(30) Foreign Application Priority Data
Jul. 24, 2013 (KR) ........................ 10-2013-0087064

(51) Int. Cl.
G11B 27/00 (2006.01)
H04N 5/77 (2006.01)
H04N 5/907 (2006.01)
H04N 9/804 (2006.01)
G11B 27/34 (2006.01)
G11B 27/031 (2006.01)
G06F 3/0484 (2013.01)
G06F 3/0488 (2013.01)
H04N 21/854 (2011.01)

(52) U.S. Cl.
CPC .......... *G11B 27/002* (2013.01); *G06F 3/0488* (2013.01); *G06F 3/04847* (2013.01);
(Continued)

(58) Field of Classification Search
CPC ..... G11B 27/002; G11B 27/031; G11B 27/34; G06F 3/04847; G06F 3/0488;
(Continued)

(56) References Cited

U.S. PATENT DOCUMENTS 7,092,620 B1 * 8/2006 Standiford ............. G11B 25/10
386/241
7,962,014 B2 6/2011 Yoon et al.
(Continued)

FOREIGN PATENT DOCUMENTS

JP 2009050015 A 3/2009
JP 1702423 6/2011
(Continued)

OTHER PUBLICATIONS

International Search Report and Written Opinion dated Apr. 15, 2014, from the corresponding PCT/KR2013/010753.
(Continued)

*Primary Examiner* — Mishawn Hunter
(74) *Attorney, Agent, or Firm* — Renaissance IP Law Group LLP

(57) ABSTRACT

The present invention relates to an apparatus of providing a user interface for playing and editing moving pictures (i.e., video) and the method thereof, the user interface being capable of maximizing learning and practice effects by providing an interface which allows inserting of cue-points in the video on the basis of beats in music or periodic signals equivalent thereto and visibly displaying cue-points, recording of one's practice clips while playing the video so as to allow video playback and practice at the same time, and the instantaneous comparison/analysis of the recorded practice clips and reference video.

12 Claims, 7 Drawing Sheets

(52) U.S. Cl.
CPC ............ *G11B 27/031* (2013.01); *G11B 27/34* (2013.01); *H04N 5/772* (2013.01); *H04N 5/907* (2013.01); *H04N 9/8042* (2013.01); *H04N 9/8047* (2013.01); *H04N 21/854* (2013.01)

(58) Field of Classification Search
CPC ...... H04N 5/772; H04N 5/907; H04N 9/8042; H04N 9/8047
USPC .......................... 386/239, 241, 248, 278, 286
See application file for complete search history.

(56) References Cited

U.S. PATENT DOCUMENTS

| | | | |
|---|---|---|---|
| 8,170,395 B2 * | 5/2012 | Sterner | ................ G11B 27/034 386/239 |
| 8,515,990 B2 | 8/2013 | Lee et al. | |
| 2001/0038742 A1 * | 11/2001 | Takano | ................ G11B 27/031 386/241 |
| 2002/0159750 A1 * | 10/2002 | Jasinschi | ................... G06T 7/20 382/254 |
| 2012/0129602 A1 * | 5/2012 | Uchida | ................ A63F 13/428 463/35 |

FOREIGN PATENT DOCUMENTS

| | | |
|---|---|---|
| JP | 2012222727 A | 11/2012 |
| KR | 1020040100636 A | 12/2004 |
| KR | 1020100092474 A | 8/2010 |
| KR | 1020120054751 A | 5/2012 |
| KR | 1020120090661 A | 8/2012 |

OTHER PUBLICATIONS

App Store, https://itunesconnect.apple.com/WebObjects/iTunesConnect.woa/wo/70.0.0.7.3.0.9.3.3.1.0.13.3.1.1.11.9.0.1.3, Nov. 27, 2012, Captured images, 11 pages.

* cited by examiner (a) Starting screen      (b) Menu screen ( Section Editing I/F )

(Section edit tool screen by unit)

Step box screen(Starting screen)     Playing screen (playing section setting tool screen)

(a) Practice image recording screen (b) Comparative playing screen

APPARATUS OF PROVIDING A USER INTERFACE FOR PLAYING AND EDITING MOVING PICTURES AND THE METHOD THEREOF

FIELD OF THE INVENTION

The present invention relates to an apparatus of providing a user interface for playing and editing moving pictures (i.e., video) and the method thereof, more specifically, an application program (or app) installed in smart devices such as a smartphone or a tablet PC, which allows playing and editing the video contents with the control of playing speed and/or playing section based on a user's convenience, and providing a interface which plays and compares the reference video and one's practice video simultaneously so as to record and edit the practice video during playing the video contents.

BACKGROUND OF THE INVENTION

Recently a number of contents which are conventionally used in PCs are now provisioned with smart devices owing to the development and dissemination of smartphones and tablet PCs; these multimedia contents are widely consumed by users of smart devices since the contents can be used anytime and anywhere due to the characteristics of smart devices such as small size and easy to carry. These multimedia contents include movie, music, music video, video lecture, and broadcast and the types of multimedia contents are very diverse and various; there are numerous application programs for using these contents and also many applications are being developed now.

In addition, whereas many different types of devices were used according to the types of multimedia contents and purposes of use in the past, only the smart device is now used for processing the jobs required in the past; likewise in terms of software people want to use a single application program with multitasking capabilities which perform various kinds of tasks related with using multimedia contents.

However, most of the existing application programs in regard with multimedia contents contain simple playing and editing functions only, and more advanced application programs providing diverse playing and editing functionalities are difficult to use for ordinary users having no profound knowledge related to the usage of application programs because they have complex and inconvenient instructions for use.

Additionally in order for users to learn and practice the content of multimedia contents they mainly depend on the method to play repeatedly a corresponding part of the reference content; in order to compare and analyze the users' learning or practice videos with the reference content the users are required to record separately their practice videos and an application program which play simultaneously the recorded practice video and the reference content in one smart device so as to compare and analyze the recorded practice video with the reference content does not exist.

Moreover conventional multimedia contents are proceeding unilaterally without regard to the different learning abilities or paces of individuals, difficult to search various sections of the contents for practicing, inappropriate to play for practicing according to one's learning ability and not having a method to verify, amend and modify one's behaviors. In conclusion, the conventional multimedia contents are appropriate for appreciation or understanding with brain not for practicing purpose.

For this reason, users have a strong request for a method to comprehend easily the overall structure of learning contents, to search and select appropriate sections of learning contents for practicing, to play and repeat easily contents regardless of one's learning ability, and to verify, amend, and modify one's practicing images.

Considering the situation described earlier, the present invention presents an integrated application program with which one can freely play and edit the multimedia contents according to one's convenience and one can effectively learn and practice at the same time while playing the multimedia contents.

SUMMARY OF THE INVENTION

The present invention has been devised to solve the problems as described above by inserting cue points (cue-points) in the video on the basis of beats in music or periodic signals equivalent thereto and visibly displaying cue-points so as to provide a user interface apparatus and the method thereof for editing the video which easily identifies a section based on the above cue-points by means of interaction between a user and the tool.

The objective of the present invention also lies in providing a user interface apparatus and the method thereof to group the video for editing based on features according to a user's convenience in which the video is divided into sections according to the phases including PART, VERSE, or ACTION by using the cue-points described above and then the sections are grouped and/or disjointed periodically or non-periodically.

In addition, the objective of the present invention lies in providing a user interface apparatus and the method thereof to allow users to effectively watch and follow the above video by playing step-by-step the sections grouped by the above method at various speeds (e.g. 0.1×, 0.5×, 1×, 1.5×, 2×, etc.) and to delay the playback of the video by 1 second, 2 seconds, 4 seconds, 8 seconds, 10 seconds, etc.

The objective of the present invention also lies in providing a user interface apparatus and the method thereof to maximize learning and practicing effect by providing an interface which allows a user to record one's practice clips while playing the video thereby to allow video playing and practicing at the same time, and to compare and analyze instantaneously the recorded practice clips and the reference video.

In accordance with an embodiment of the present invention, the apparatus of providing a user interface for playing video contents comprises an input unit for receiving said video contents as input, a control unit for controlling the playback of said video contents and an output unit for outputting the video contents, wherein said contents comprises at least one video file and at least one data file containing cue-points or grouping information, and wherein said control unit plays said video file based on said data file. Said control unit further comprises a playback section setting unit and thus the apparatus allows a user to select the above playback section since said video contents is divided into sections beforehand according to the content. Said control unit comprises at least more than one of a playback speed setting unit, a playback delay setting unit, a section repetition setting unit, a playback countdown setting unit, or the combinations thereof. The apparatus further comprises a video contents practice control unit. Said video contents practice control unit comprises at least more than one of a practice video recording unit while playing said video contents a comparison playback unit compares and analyzes said practice video contents with said video contents as a reference video contents; or combinations thereof. The apparatus for a user interface for editing video contents comprises an input unit for receiving said video contents as input, a control unit for controlling the editing of said video contents, and an output unit for outputting said edited video contents, wherein said edited video contents comprises at least one of video file and at least one of data file containing cue-points or grouping information. Said control unit comprises a cue-point insertion unit and a section editing unit. Said control unit comprises a storing unit for storing the edited video contents.

Additionally in accordance with another embodiment of the present invention, the method of providing a user interface for playing video contents comprises receiving said video contents as input, controlling the playback of said video contents, and outputting said video contents, wherein said video contents comprises at least one of video file and at least one of data file containing cue-points or grouping information, and wherein said controlling the playback of said video contents plays said video file based on said data file. Said controlling the playback of said video contents comprises setting playback section and thus the method allows a user to select the above playback section since said video contents is divided into sections beforehand according to the content. Said controlling the playback of said video contents comprises at least more than one of setting playback speed, setting playback delay, setting section repetition, setting playback countdown time, or combinations thereof. Said controlling the playback of said video contents comprises controlling the practice of said video contents. Said controlling the practice of said video contents comprises at least more than one of recording practice video contents while playing said video contents compares and analyzes said practice video contents with said video contents as a reference video contents or combinations thereof. The method of providing a user interface for editing video contents comprises receiving said video contents as input, controlling the editing of said video contents, and outputting edited video contents, wherein said edited video contents comprises at least one of said video contents file and at least one of data file containing cue-points or grouping information. Said controlling the editing of said video contents comprises inserting cue-point and editing section. Said controlling the editing of said video contents comprises storing the edited video contents.

The present invention relates to a user interface device for playing and editing a video and a method thereof, the user interface device having the efficacy of maximizing learning and practice effects by providing an interface, which allow inserting of cue-points in the video on the basis of beats in music or periodic signals equivalent thereto and visibly displaying cue-points so as to edit the video by easily identifying a section based on the above cue-points by means of interaction between a user and the tool; editing the video based on features according to a user's convenience in which the video is divided into sections according to the phases including part (PART), verse (VERSE), or action (ACTION) by using the cue-points described above and then the sections are grouped and/or disjointed periodically or non-periodically; allowing users to effectively watch and follow the above video by controlling the playback speed for each section grouped by the above method and setting up delay time for the playback of the video; and providing an interface which allows a user to record one's practice clips while playing the video thereby to allow video playing and practicing at the same time, and to compare and analyze instantaneously the recorded practice clips and the reference video.

DETAILED DESCRIPTION OF THE PREFERRED EMBODIMENTS

Hereinafter, an embodiment of the user interface apparatus for playing and editing a video and the method thereof in accordance with the present invention will be described with reference to the accompanying figures.

Figure 1:
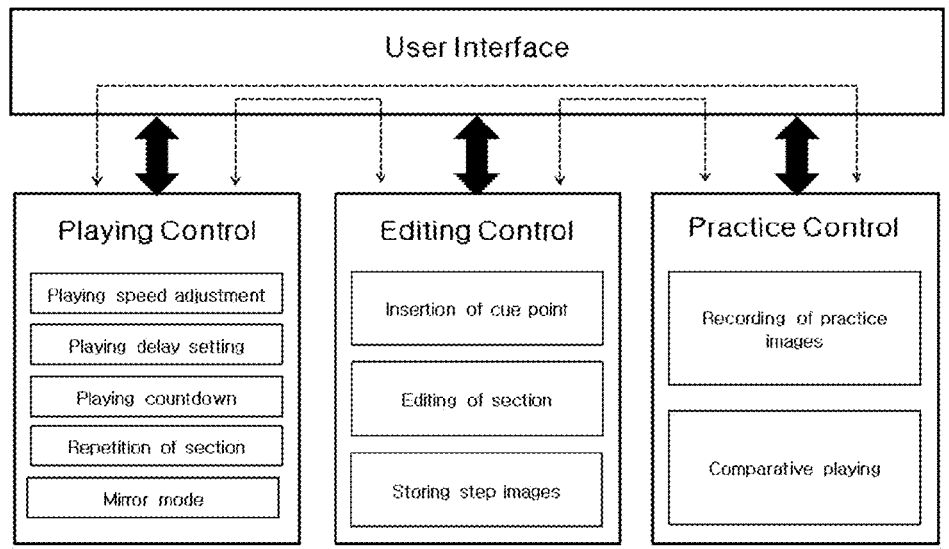
FIG. 1 is an exemplary diagram for explaining the function of the user interface apparatus for video playback and editing in accordance with an embodiment of the present invention.

FIG. 1 is an exemplary diagram for explaining the function of the user interface apparatus for video playback and editing in accordance with an embodiment of the present invention.

As shown in FIG. 1, the user interface apparatus for video playback and editing is an application program in smart devices such as smartphones and tablet PC, which plays and edits freely multimedia contents such as video and provides various functions for a user's convenience.

The user interface apparatus for video playback and editing provides largely video playback control function, practice control function, and editing control function; and the above control functions are integrated in the user interface apparatus for video playback and editing.

The above playback control function includes a playback speed control function which is capable of adjusting the playback speed of a video, a playback delay setting function for each section of a video which is capable of delaying the playback of video by user assigned period of time, a playback countdown function in which a video is played after a pre-assigned period of time when touching the playback button, a repeat playback function which plays a specific section of a video repeatedly, and a mirror mode function in which the left and right part of a video is switched over for allowing a user to repeat easily the played video.

In the present invention, in addition to all the common basic control functions related with video playback the user interface apparatus for video playback and editing includes the playback control functions as described above and these functions directly constitute the technical features of the present invention. More specifically speaking, the user interface apparatus for video playback and editing provides control functions which can play the video file edited with the present invention in a number of ways according to a user's convenience based on a data file (cue-point and grouping information) related with the content of the video contents. The information on the data file will be described in more detail in the video edit control function.

In addition, the above practice control functions provide a practice video recording function which can check up a user's appearance in real-time during learning or practice so as to confirm and record a user's practice video clips while playing the video contents and analyze effectively the user's practice video clips by playing the above recorded practice video clips and comparing them with the corresponding parts of the above video contents in a single display.

This function provide an experience environment in which one can practice by oneself while watching a lot of video contents; for example, one can record one's swing scene while watching the video contents on golf swing motion and play and compare one's golf swing motion in synchronization with the reference video so as to correct effectively one's swing form.

Golf swing is just a case; exercising user's motion (e.g. mastering a basic motion in sports), and identifying mouth shape and practicing pronunciation of foreign languages are also possible; and the use cases are not limited to those listed above.

In addition, the above editing control function includes a cue-point inserting function which inserts cue-points on the basis of beats in music or periodic signals equivalent thereto and visibly displays cue-points in a video, a section editing function which edits easily sections of the above video based on the above inserted cue-points by means of interaction between a user and the tool, and an edited video storing function which records a step video adding the video related information and screenshots of important points into the edited video. The above step video is an edited video content which can be played in the user interface apparatus for video playback and editing of the present invention.

This function provisions video contents which can be viewed effectively with the playback control function in the present invention, and provides an editing function of the recorded video contents for specific purpose to make new contents for maximizing learning effect, motion practice or means of communication. Hence, one can easily edit the specific video contents using cue-points insertion or section editing function to meet one's taste.

This function is to make a variety of editing and customizing the video contents using cue-points and repeat playback function based on the types of contents, and it is applicable to all kinds of contents including human motion, language or music.

The video editing control function of the present invention is to generate the data file including cue-points or grouping information while the source video is left as it is, specifically not to reconfigure and edit the source video. A user can play the video content in a number of ways according to one's taste based on the generated data file.

The above functions are associated with one another and more specifically a user can play a video after editing the video according to one's convenience, edit the video while playing using the video edit mode, use the practice control function recording one's practice video clips and playing and comparing the practice video clips while playing the video, and edit the practice video clips.

Further the above control functions and the user interface may be configured independently into separate applications, but it is possible to implement the functions in a single platform to operate with a single user interface, and it is also possible to configure applications including a user interface for individual control function to operate in conjunction with one another.

Hereinafter, each function of the present invention will be described with reference to the detailed user interface screen.

Figure 2:
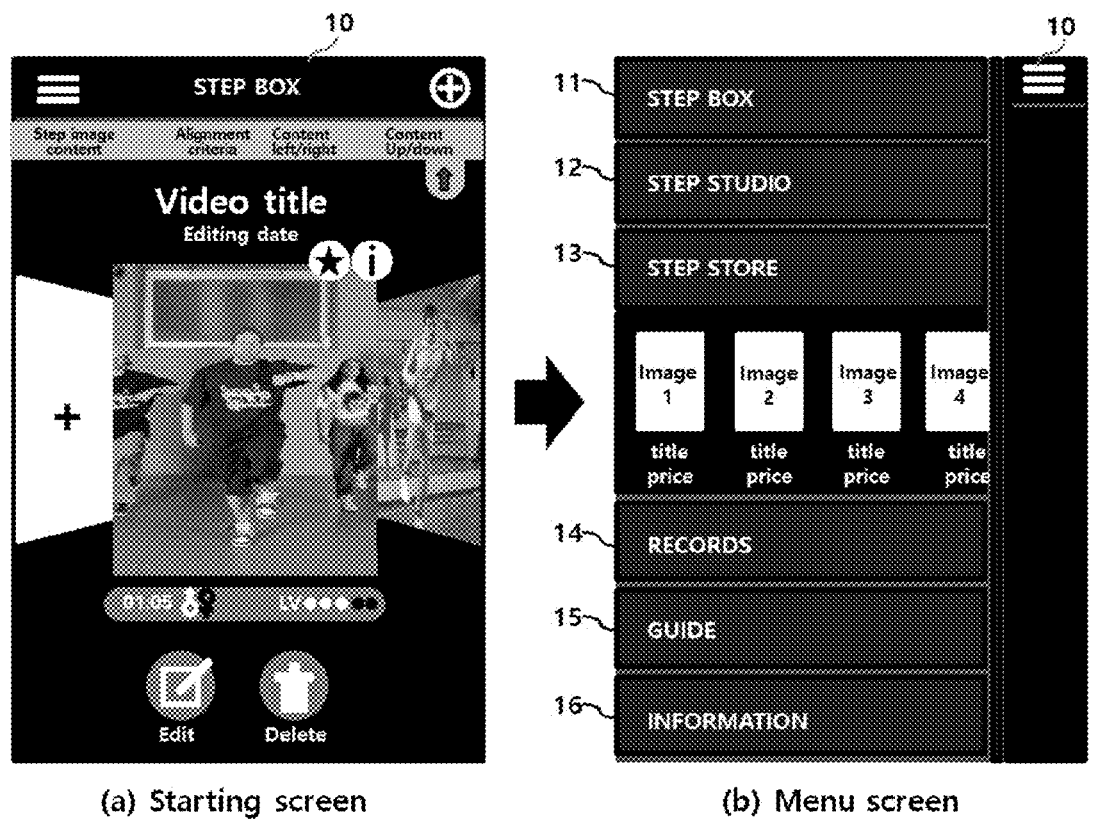
FIG. 2 is an exemplary diagram for illustrating a menu screen of the user interface device for video playback and editing in accordance with an embodiment of the present invention.

FIG. 2 is an exemplary diagram for illustrating a menu screen of the user interface device for video playback and editing in accordance with an embodiment of the present invention.

As shown in FIG. 2, by touching the menu button (10) in the upper left corner of the start screen of the user interface device for video playback and editing the menu screen is activated, the menu display (10) is moved to the right. The above start screen is a STEP BOX screen and will be described with the subsequent playback-related functions simultaneously.

The above menu screen consists of a step box menu (STEP BOX) (11), the step studio menu (STEP STUDIO) (12), a step store menu (STEP STORE) (13), a recorded video menu (RECORDS) (14), a guide menu (GUIDE) (15), and information menu (INFORMATION) (16). Wherein the step box menu (11) includes functions related to video content playback and practice, and the step studio menu (12) includes editing functions to insert cue-points in the video, to group section of the video based on the inserted cue-points, and to store the edited video in this manner as a step video by adding additional information. The above step store menu (13) includes a menu that provides store function buying video contents and displays screenshots, titles and prices of the above video contents in the menu screen; when touching the above step store menu, a user can find detailed information of each video content including title, play time, difficulty level, the target gender (male, female, or mixed) of the video content, and price. The above recorded video menu includes functions playing and editing the recorded practice video clips with the practice video recording function and the above guide menu (15) provides detailed instructions of each menu in the user interface device for video playback and editing. In addition, the above information menu (16) provides the relevant information such as manufacturer information and support information to the user interface device for video playback and editing.

Figure 3:
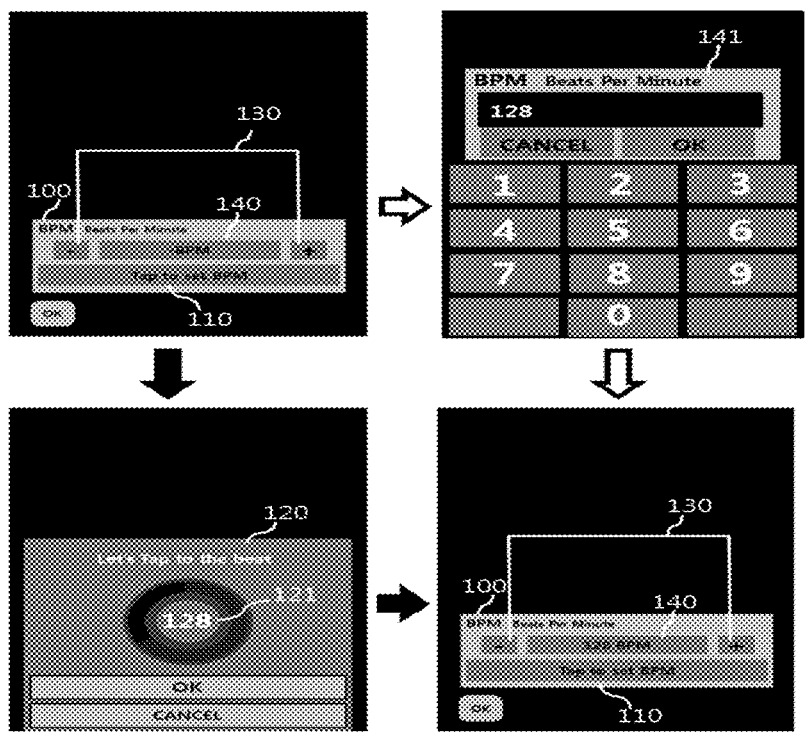
FIG. 3 is an exemplary diagram for explaining the cue-point insertion function of the user interface apparatus for video playback and editing in accordance with an embodiment of the present invention.

FIG. 3 is an exemplary diagram for explaining the cue-point insertion function of the user interface apparatus for video playback and editing in accordance with an embodiment of the present invention.

As shown in FIG. 3, the user interface device for video playback and editing may insert cue-points in the video on the basis of beats in music or periodic signals equivalent thereto and in this explanation the insertion of cue-points using BPM (Beats Per Minute) is described as an exemplification. Noe that the insertion of cue-points means to create a data segment of key frames between the video images to the closest point in time that a user specified and the present invention allows a user to visibly displaying the inserted cue-point and to easily divide and edit sections of the video with this.

In the present invention, the insertion of a cue-point in the video is performed with the tool activated automatically when a user select a video to edit at the above step studio menu (12). The cue-point insertion method to the video content is to select first the step studio menu (12) in the menu and select the video to edit; then the number of beats in the current video is displayed and a BPM setting tool is opened in which a user may insert a new beat or adjust inserted beats. In the BPM setting tool (100), a user may insert beats using tools activated when touching BPM insertion button (Tap to set BPM) (110) or BPM input button (140), respectively. When touching the BPM insertion button (110), a beat insertion tool (120) is opened which allows a user to insert beats in the video with touching screen. A user may use the tap (TAP) button (121) of the above beat insertion tool to insert beats by touching the button at a certain number per minute and the inserted number of beats is displayed in the above tap button (121). To do this, the user can insert the relatively correct number of beats one intended to the video by showing the passage of time in the borders of the above tap button when inserting the beats. After inserting beats and touching the check (OK) button on the beat insertion tool (120), the BPM setting tool (100) is opened again and the number of beats the user inserted is displayed; herein the user may again adjust the number of beats using the +/− button (130). In addition, when touching the above BPM input button (140), the beat input tool (141) is opened in which the user may directly enter the number of beats inserted. The user may enter the number of beats inserted using the numeric keypad of the above beat input tool (141). The inserted beats into the video are a unit for dividing sections of the video and they are used to play and edit the video.

Figure 4:
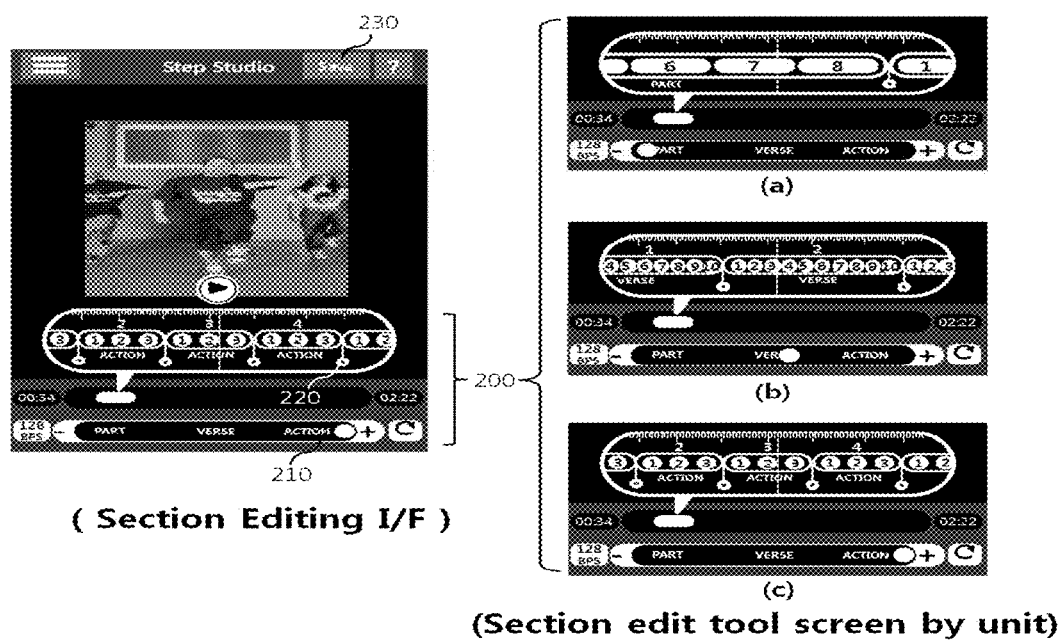
FIG. 4 is an exemplary diagram for explaining the section editing function of the user interface apparatus for video playback and editing in accordance with an embodiment of the present invention.

FIG. 4 is an exemplary diagram for explaining the section editing function of the user interface apparatus for video playback and editing in accordance with an embodiment of the present invention.

As shown in FIG. 4, the user interface apparatus for video playback and editing provides an interface to edit easily each section of a video according to a user's convenience. The editing process can be performed with a section edit tool (200) which is opened at the lower part of video playback display when determining the number of beats with the above BPM setting tool (100) and touching check (OK) button. The section edit tool (200) can display and edit the corresponding section while playing the video and the section can be adjusted and displayed according to the order of part (PART), verse (VERSE), and action (ACTION) units with section control unit (210). In the above section units, all (ALL) consists of multiple parts (PART); the above part consists of multiple verses (VERSE); and the verse consists of multiple actions (ACTION). The numbers in each part mean verse; the numbers in each verse mean action; and the numbers in each action mean the minimum unit of playing and editing the video.

In addition, the initial sections of a video before editing is divided at equal intervals by the inserted beats as the cue-points and a section indication bar (220) is displayed at the start and end points of each section. A user may group or separate the sections of the video periodically or non-periodically by touching and dragging the above section indication bar (220), divide the grouped section of the video by dragging from top to bottom like cutting down the section of the video, and re-group the grouped section of the video by controlling the section unit (PART, VERSE, ACTION). To do this, the user can edit the video according to one's convenience with the interaction between the user and the tool.

The video edited by inserting cue-points and grouping sections can be saved as a step video with a save button (SAVE) (230). As explained above, saving of the step video is performed with the save button (230) located at the upper part of the section edit interface. A user enables the step video save interface tapping the save button (230); the user enters the name of video, screenshots (up to 5 images), and the details of the video contents; and the user taps again the save button (230) so as to complete the save operation. The video content saved as a step video is played in a variety of ways with the step box menu (11).

The above screenshots are used as a representative image of each step video in the step video list and the representative image is automatically changed by up to 5 pictures (or setting up more than 5 pictures is also possible) according to the number of saved screenshots. This feature enables a user to identify the content of a video from the representative images of the step video list without playing the step videos. In addition, the detailed information of the video content includes genre (Genre), the target gender (Gender), learning difficulty level (Level), etc. and therefore the user can effectively select a video content needed by providing this additional information.

Figure 5:
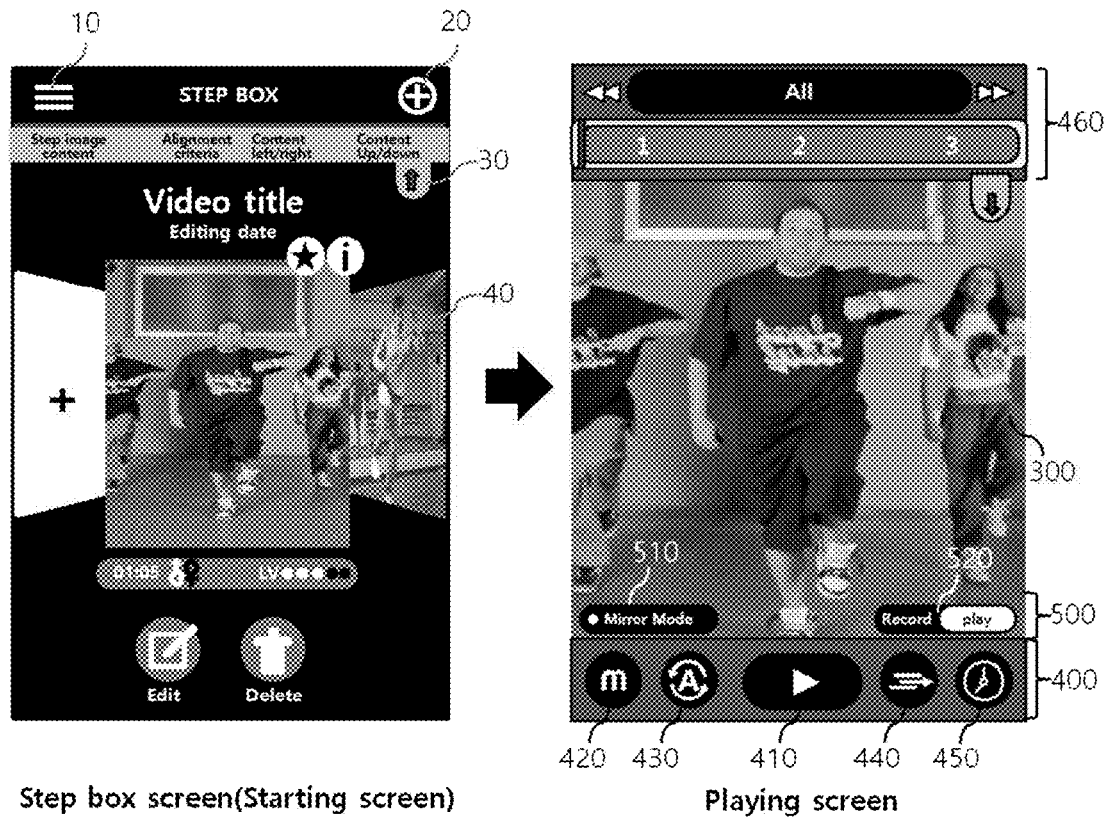
FIG. 5 is an exemplary diagram for illustrating the screen configuration of the user interface for video playback and editing in accordance with an embodiment of the present invention.

FIG. 5 is an exemplary diagram for illustrating the screen configuration of the user interface for video playback and editing in accordance with an embodiment of the present invention.

As shown in FIG. 5, a user should first select a video played from the step box screen in order to play the video content on the user interface apparatus for video playback and editing. The step box screen is firstly activated as a start screen when running an application program and consists of menu button (10), step studio and menu button to directly move to step store, menu hiding button (30) that open and close menus provided by each screen besides the main menu, and step video list (40). In the step box screen, the menus opened and closed with the menu hiding button (30) consist of the step video list button selecting all videos, edited videos, recorded videos, or favorite videos, the sort criteria button for the step video list, and the list arrange button displaying the step video list in left to right or top to bottom fashions as shown in FIG. 5. Furthermore at the top of the above step video list (40), a button for setting up the title of video, the date for the final editing, and favorite videos and a button for displaying the detailed information on the corresponding video are located; at the bottom of the step video list (40) additional information such as playing time, target gender, learning difficulty level, etc. is displayed. Furthermore at the bottom of the above step box screen buttons for deleting and editing step videos selected from the above step video list (40) are located.

When selecting a video for playback by tapping the video from the step video list on the above step box screen, a playback screen is activated for the corresponding video.

The playback screen largely consists of a video playback part (300), a playback tool (400), and a status notification window (500). The video playback part (300) may be a touch screen panel of the smart device in which the video content is played and the playback tool (400) is position at the upper/lower parts of the video playback part. The playback tool located at the lower part consist of a playback button (410), a mirror mode button (420), a repeat playback setting button (430), a playback speed setting button (440), and a playback delay setting button (450); on top of the lower playback tool, the status notification window (500) including a mirror mode display unit (510) and recording/ playing indication part (520) which display the on/off state of the above mirror mode and the current state indicating recording/playing, respectively, is located. Also a playback section setting tool (460) is located at the upper part of the playback screen.

Position and shape of the menu or button described in the present invention are presented as an embodiment of the present invention; it is certain that various modifications are to be used by an ordinary skilled person. Therefore, this modified use also belongs to the scope of the present invention.

For a detailed explanation of playback-related tools and buttons of the playback screen will be described in more detail with reference to FIG. 6 and FIG. 7.

Figure 6:
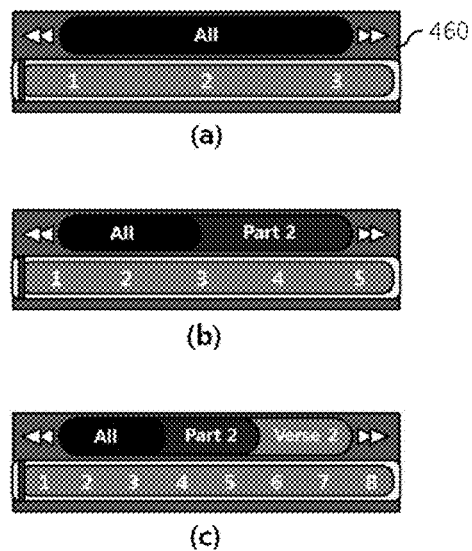
FIG. 6 is an exemplary diagram for explaining the function of setting up a playback section of the user interface device for video playback and editing in accordance with an embodiment of the present invention.

FIG. 6 is an exemplary diagram for explaining the function of setting up a playback section of the user interface device for video playback and editing in accordance with an embodiment of the present invention.

The unit of video sections that can be set in the playback section setting tool (460) is similar to the way in which they appear in the above section editing tool (200). Namely the sections of a video consist of the smallest unit of action (ACTION), the verse (VERSE) made up of a combination of the actions, the part (PART) made up of a combination of the verses, and a full (ALL) video made up of a combination of the parts; each section unit can be played by selection using only a simple touch. For example, the numbers (1, 2, 3) below the full (ALL) video of the video indicates parts (PART) comprising the full video; if a user touch part 2, the playback section setting tool (460) displays ALL—PART 2 and the verses (1, 2, 3, 4, 5) comprising the part 2; if the user touch verse 2 again, the above playback section setting tool (460) displays ALL—PART 2—VERSE 2 and the actions (1, 2, 3, 4, 5, 6, 7, 8) comprising the verse 2. As in the same way, the user can freely select the section of video to be played by manipulating the playback section setting tool (460).

Figure 7:
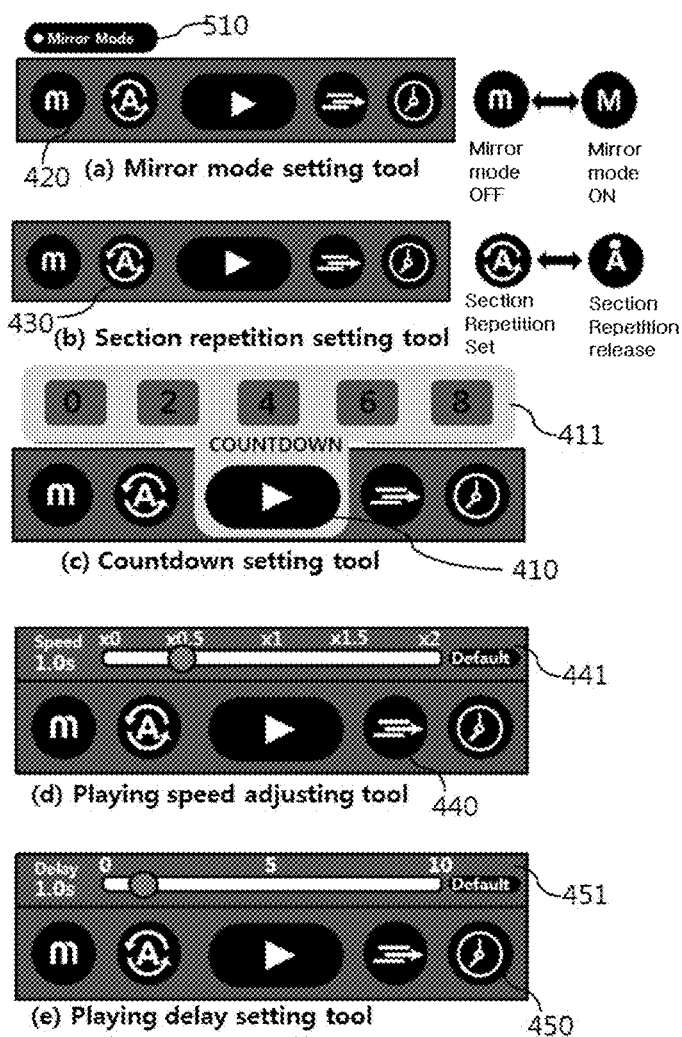
FIG. 7 is an exemplary diagram for explaining the playback function of the user interface for video playback and editing in accordance with an embodiment of the present invention.

FIG. 7 is an exemplary diagram for explaining the playback function of the user interface for video playback and editing in accordance with an embodiment of the present invention.

As shown in the FIG. 7, the user interface apparatus for video playback and editing provides functions controlling the playback speed for each section of the video, setting up the delay time for each section of the video, delaying the playback of the video by a certain period of time after touching the playback button, playing repeatedly a specific section of the video using the repeat playback function, and a mirror mode function in which the left and right part of a video is switched over to give an mirror image for allowing a user to repeat intuitively the played video.

The mirror mode function which plays a video content by switching over left and right sides of the screen allows a user to learn and exercise more effectively while playing the video content and is set up with the mirror mode button (420). When the user touches the mirror mode button (420), the letters in the mirror mode button are changed indicating that the mirror mode is in use and additionally the light in the mirror mode display unit (510) is turned on for the user to easily check the current status.

Further the above repeat playback function can be set up with the repeat playback setting button (430) in the above playback tool. If a user touches the above repeat playback setting button (430) the video section displayed in the above playback section setting tool (460) is played repeatedly and if the user touches again the repeat playback setting button (430) the repeat playback setting is stopped. In addition, like the above mirror mode button (420), the letters in the repeat playback setting button (430) are changed so as to allow a user to easily identify whether the current state is in the repeat playback mode or not.

In addition, the above countdown function is primarily used for studying the video content in which the video is played after a certain period of time when touching the playback button; it can be useful in case of exercising or learning while watching in real-time the video like dancing. The above countdown function is set up by touching and holding the playback button (410). If a user touches and holds the above playback button, a countdown setting tool (411) is opened at the upper part of the playback tool and the user can set up the playback countdown time (0 seconds, 2 seconds, 4 seconds, 6 seconds, 8 seconds, etc.) with touch-and-drag method.

The above playback speed control function is set up by the playback speed setting button (440) in the above playback tool. If a user touches the above playback speed setting button (440), a playback speed control tool (441) is opened at the upper part of the playback tool. The playback speed control tool (441) allows a user to easily control the playback speed by ×0.5, ×1, ×1.5, ×2, etc. with touch-and-drag method; the user can maximize the learning effect by increasing or decreasing the playback speed depending on the performance of studying the video content. Also, the default (Default) button in the above playback speed control tool (441) can revert to the initial playback speed setting with a simple touch of the default button.

In addition, the above delay setting function is set up by the playback delay setting button (450) in the above playback tool. If a user touches the above playback delay setting button (450), a playback delay setting tool (451) is opened at the upper part of the playback tool. Like the above playback speed control tool (441), the playback delay setting tool (451) allows a user to adjust the playback delay from 0 second to 10 seconds with touch-and-drag method; the user can exercise and practice each section of the content when studying the video content. Additionally like the above playback speed control tool (441), the default (Default) button in the above playback delay setting tool can revert to the initial playback delay setting with a simple touch of the default button.

On the other hand, a user can easily identify the structure of a video content by displaying a Seekbar at the bottom of the playback screen. The above Seekbar shows the entire contents of the video separated by Beat, Bar, Sentence; the above Sentence consists of multiple Bars and the above Bar consists of multiple Beats. The above Seekbar displays the current playing portion of the video contents and the user can set up the Seekbar with the desired type among Beat, Bar, and Sentence. In this way the user can easily comprehend the structure of the video content since the Seekbar displays simultaneously the entire sections and a specific section of the video stereoscopically in a tool.

Figure 8:
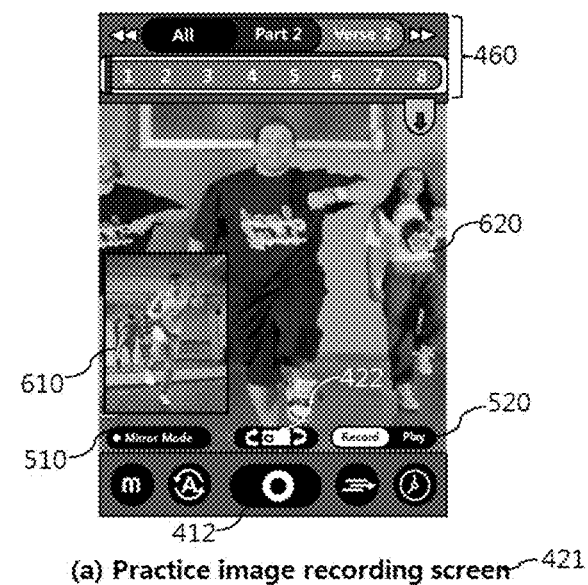
FIG. 8 is an exemplary diagram for explaining the practice function of the user interface device for video playback and editing in accordance with an embodiment of the present invention.
Figure 8:
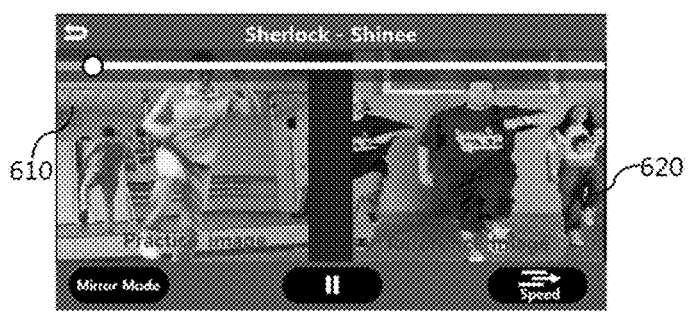

FIG. 8 is an exemplary diagram for explaining the practice function of the user interface device for video playback and editing in accordance with an embodiment of the present invention.

As shown in FIG. 8, the user interface apparatus for video playback and editing provides functions to watch one's practice video (610) while playing the video content through a practice video recording function, to record one's practice video (610), and to play and compare one's practice video (610) with a reference video (620).

If a user sets up a video for practicing in real-time using the playback section setting tool (460), and touches the playback button (410) in the playback tool and drags to the right, then the user's practice video on the camera of a smart device is displayed in real-time on top of the mirror mode display unit. Additionally the playback button (410) is converted to the recording button (412); if the user touches the recording button (412), the user's practice video is recorded while playing the video content and the Record light in the Record/Play display unit of the status notification window is on. Additionally a camera switch button (422) is opened on top of the above recording button (412); it performs the change of the recording camera between the front and the rear cameras of a smart device depending on the situation.

When the user touches the above recording button (412) again after recording one's practice video in the way described above, the comparison playback screen consisting of one's practice video (610) and the reference video (620) is opened automatically. The above comparison playback screen can play one's practice video (610) and the reference video (620) at the same speed so as to allow the user to analyze effectively one's progress and problems.

On the other hand, when recording a practice video, a user may select a specific section of the video content for practice with the above Seekbar. When the user selects the start and the end points of recording with the Seek bar beforehand and starts recording of the practice video, the recording is stopped automatically after playing the reference video to the end without touching the playback button, and the comparison playback screen consisting of the practice video (610) and the reference video (620) is opened.

Figure 9:
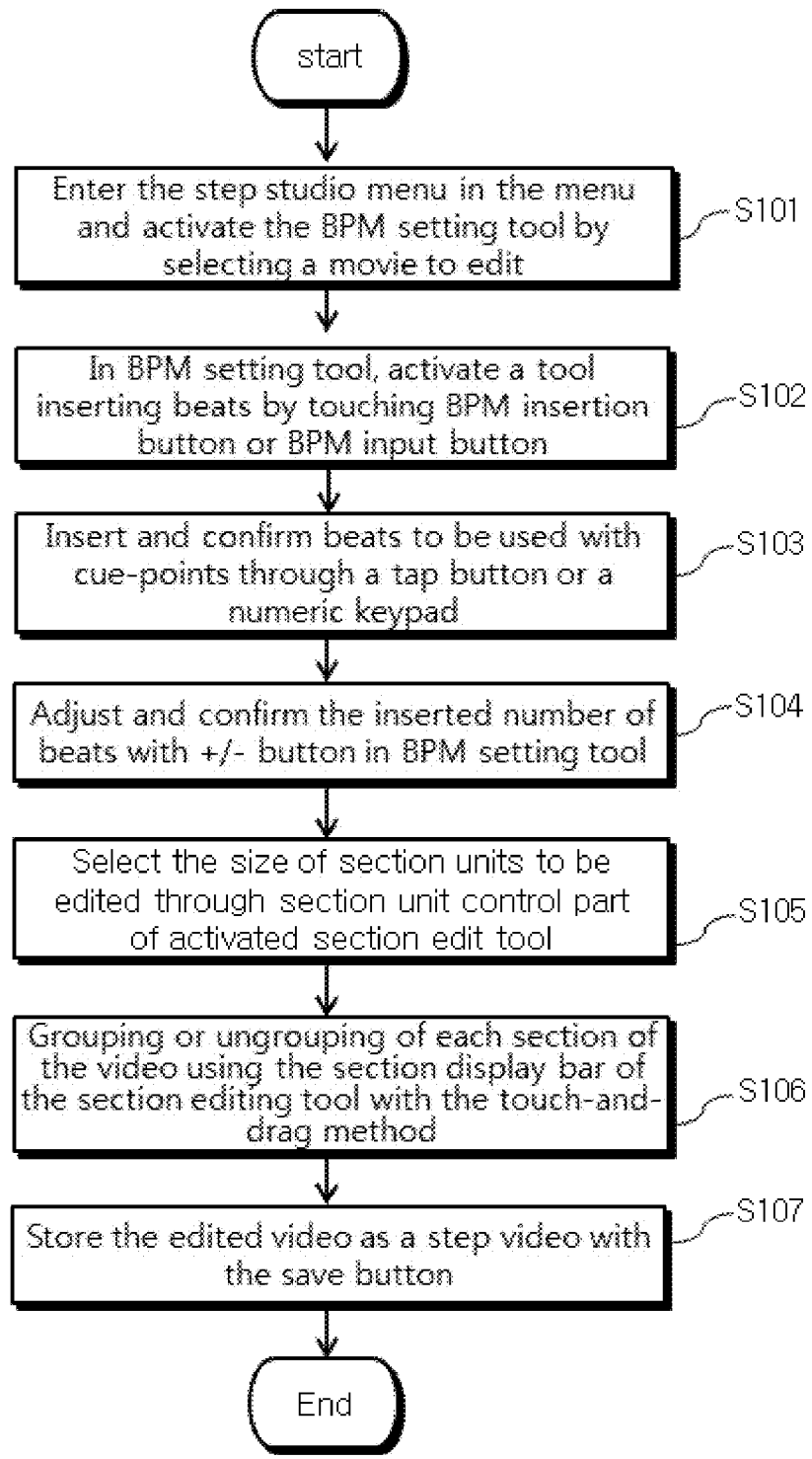
FIG. 9 is a flow chart for explaining the editing process of the user interface device for video playback and editing in accordance with an embodiment of the present invention.

FIG. 9 is a flow chart for explaining the editing process of the user interface device for video playback and editing in accordance with an embodiment of the present invention.

As shown in FIG. 9, the editing process of the user interface apparatus for video playback and editing is as follows:

Firstly a user enters the step studio menu (12) in the menu and activates the BPM setting tool by selecting a movie to edit (S101); in the above BPM setting tool, the user activates a tool inserting beats by touching BPM insertion button or BPM input button (S102); hereafter the user inserts beats to be used with cue-points by touching a tap button in the above beat insertion tool or entering the number of beats with the numeric keypad (S103). Since time is displayed on the border of the above tap button when inserting beats like this, the user can effectively insert the number of beats intended. After inserting beats and touching the OK button, the BPM setting tool showing the inserted number of beats is displayed. The user completes the beat insertion process by adjusting the inserted number of beats with +/− button, finally adjusting the number of beats inserted, and then touching the OK button (S104). After the completion of the beat insertion process as described above the section editing tool is activated and the user can select the unit (PART, VERSE, ACTION) of the video edited with the section unit control part of the above section editing tool (S105). After selecting the unit of the video, the user can perform grouping or ungrouping of each section of the video using the section display bar of the section editing tool with the touch-and-drag method (S106). After completing the section editing process as described above, the user can store the edited video as a step video with the save button (S107).

Figure 10:
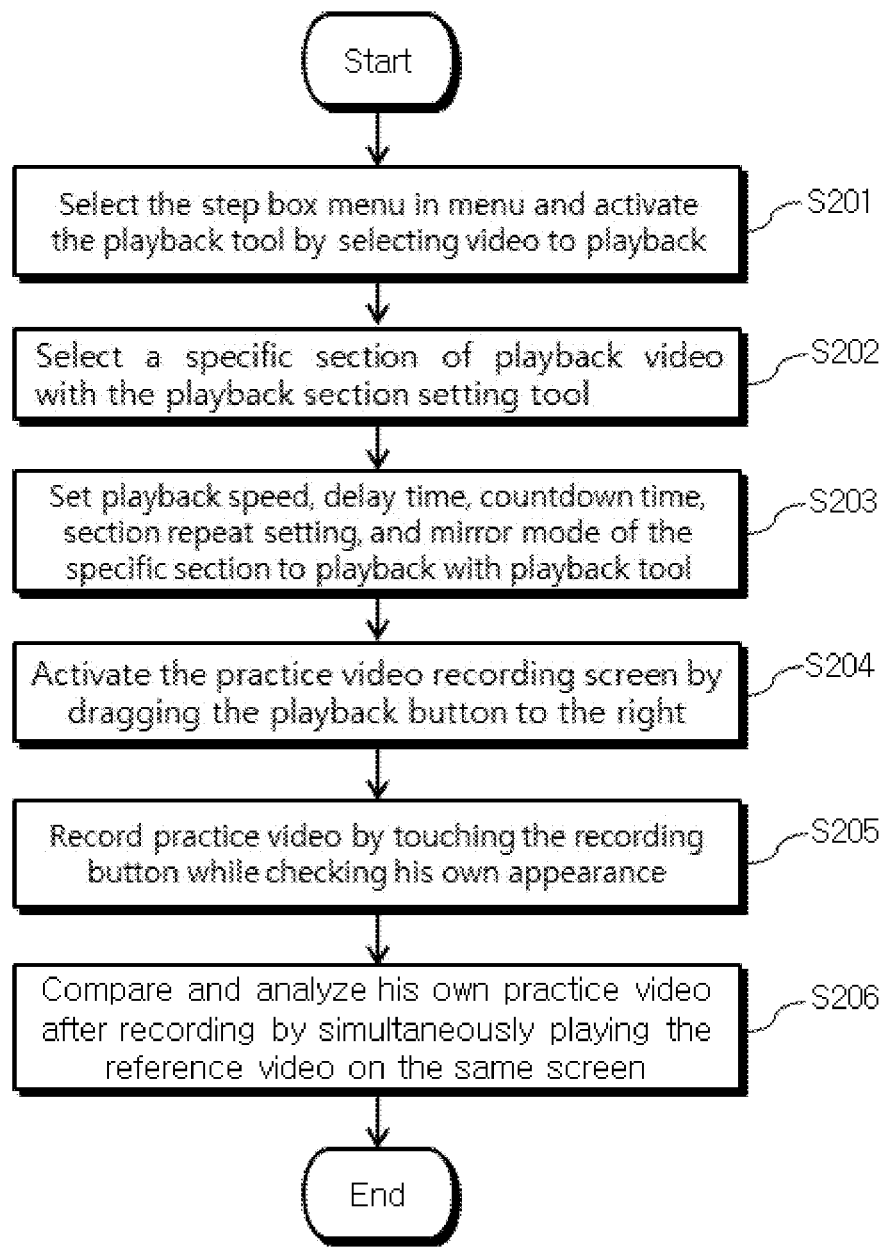
FIG. 10 is a flowchart for explaining the playback process of the user interface device for video playback and editing in accordance with an embodiment of the present invention.

FIG. 10 is a flowchart for explaining the playback process of the user interface device for video playback and editing in accordance with an embodiment of the present invention.

As shown in FIG. 10, a user selects the step box menu (11) and activates the playback tool by selecting a video to exercise in the playback and practice process of the user interface device for video playback and editing (S201). The user selects a specific section of the video to exercise with the playback section setting tool in the above playback tool (S202) and then selects playback speed, playback countdown time, section repeat setting, and mirror mode using the playback tool on the lower part of the screen so as to allow the user to exercise easily when practicing the section (S203). The user may activate the practice video recording screen by dragging the playback button to the right while playing the video according to the user's convenience (S204). The user may continue the practice while checking the user's appearance through the activated practice video recording screen and record the user's practice video by touching the recording button (S205). As described above, when the user records the practice video and complete the recording by touching the playback button again, the comparison playback screen in which the practice video and the reference video corresponding to the practice video are played simultaneously in one screen is activated and the user may play and compare the state of himself (S206).

As described above, the user interface apparatus for video playback and editing allows a user to play a video file in various ways according to the user's convenience based on the data file (cue-points and grouping information) related with the video content and to check and record the user's practice video while playing the video content; in addition by providing various learning video contents through a store the user can maximize the learning and practice effects in a variety of areas including sports practice and exercise such as dancing or golf or repetition study of subjects needing memorizing such as language.

The present invention has been described above with reference to an embodiment shown in the figures, which is exemplificative only and the various and equivalent embodiments are possible by those who have ordinary knowledge in the area the present invention belongs to. Therefore, the technical scope of the present invention will be determined by the claims below.

What is claimed is:

1. An apparatus of providing a user interface for playing video contents, the apparatus comprising: an input unit for receiving the video contents as input; a control unit for controlling the playback of the received video contents; and an output unit for outputting the video contents according to controlling of the playback, wherein the video contents comprises at least one or more than one of video file and at least one or more than one of data file containing cue-points inserted to the video contents at equal intervals for identifying playback sections of the video contents, grouping information which is the information of dividing the video file into sections step by step according to phases including part, verse or action by using the cue-points and periodically or nonperiodically grouping each playback section by using the cue-points, or combinations thereof, wherein the video consists of multiple parts, the parts consisting of multiple verses, and the verse consists of multiple actions; and wherein the control unit plays the video file based on the data file.

2. The apparatus of claim 1, wherein the control unit further controls the playback of the video contents by adjusting the playback speed; by delaying the playback for each playback section; by performing the playback after pre-assigned period of time with touching playback button; by repeatedly performing the playback for a specific section of the video contents; by performing the playback switching over left and right parts of the video contents; or combinations thereof.

3. The apparatus of claim 1, further comprising a video contents practice control unit, which enables: at least more than one of a practice video contents to be recorded while playing the video contents; a compared playback to be performed for comparing and analyzing the video contents and the practice video contents by referring to the video contents and the practice video contents; or combinations thereof.

4. An apparatus of a user interface for editing a video contents, the apparatus comprising: an input unit for receiving the video contents as input; a control unit for controlling the editing of the video contents, in which section editing is performed by inserting cue-points in the video contents; and an output unit for outputting an edited video contents according to the controlling of the wherein the edited video contents comprises at least one of original video files and at least one of data the comprising cue-points inserted at equal intervals for identifying the playback sections of the video contents, grouping information needed to perform section editing by dividing the video the into sections step by step according to phases including part, verse or action by using the cue-points and periodically or nonperiodically grouping each playback section using the cue-points, or combinations thereof, wherein the video consists of multiple parts, the parts consisting of multiple verses, and the verse consists of multiple actions.

5. The apparatus of claim 4, wherein the apparatus further comprising a storing unit for storing the edited video contents.

6. A method of providing a user interface for playing a video contents comprising: receiving the video contents as input; controlling the playback of the received video contents; and outputting the video contents according to the controlling of the playback, wherein the video contents comprises at least one or more than one of video file and at least one or more than one of data file containing cue-points inserted to the video contents at equal intervals for identifying playback sections of the video contents, grouping information which is the information of dividing the video using the cue-points and periodically or nonperiodically grouping playback each section by using the cue-points, or the combinations thereof, wherein the video consists of multiple parts, the parts consisting of multiple verses, and the verse consists of multiple actions; and wherein the control unit plays the video the based on the data file.

7. The method of claim 6, wherein the controlling of the playback further controls the playback of the video contents by adjusting the playback speed; by delaying the playback for each playback section; by performing the playback after pre-assigned period of time with touching playback button; by repeatedly performing the playback for a specific section of the video contents; by performing the playback switching over left and right parts of the video contents; or the combinations thereof.

8. The method of claim 6, wherein the controlling of the playback comprising controlling the practice of the video contents, which enables: at least more than one of a practice video contents to be recorded while playing the video contents; a compared playback to be performed for comparing and analyzing the video contents and the practice video contents by referring to the video contents and the practice video contents; or combinations thereof.

9. A non-transitory computer-readable recording medium having recorded thereon a program code for executing the method of providing a user interface for playing the video contents of claim 6.

10. A method of providing a user interface for editing a video contents, wherein the method comprising: receiving the video contents as input; controlling the editing of the video contents, in which section editing is performed by inserting cue-points in the video contents; and outputting an edited video contents according to controlling of the editing; wherein the edited video contents comprises at least one or more than one original video file and at least one or more than one data file comprising cue-points inserted at equal intervals for identifying the playback sections of the video contents, grouping information needed to perform section editing by dividing the video file into sections step by step according to phases including part, verse or action by using the cue-points and periodically or nonperiodically grouping each playback section using the cue-points, or combinations thereof, wherein the video consists of multiple parts, the parts consisting of multiple verses, and the verse consists of multiple actions.

11. The method of claim 10, the method further comprising storing the edited video contents.

12. A non-transitory computer-readable recording medium having recorded thereon a program code for executing the method of providing a user interface for editing the video contents of claim 10.

\* \* \* \* \*